US012785826B2

(12) United States Patent
Mody

(10) Patent No.: US 12,785,826 B2
(45) Date of Patent: Nov. 3, 2026

(54) COGNITIVE VIRTUAL RADIO ACCESS NETWORK ARCHITECTURE

(71) Applicant: A10 SYSTEMS INC, Lowell, MA (US)

(72) Inventor: Apurva N. Mody, Chelmsford, MA (US)

(73) Assignee: A10 SYSTEMS INC, Lowell, MA (US)

(*) Notice: Subject to any disclaimer, the term of this patent is extended or adjusted under 35 U.S.C. 154(b) by 484 days.

(21) Appl. No.: 18/069,192

(22) Filed: Dec. 20, 2022

(65) Prior Publication Data

US 2023/0198644 A1 Jun. 22, 2023

Related U.S. Application Data

(60) Provisional application No. 63/291,849, filed on Dec. 20, 2021.

(51) Int. Cl.
*H04B 17/336* (2015.01)
*H04W 72/0453* (2023.01)
*H04W 72/541* (2023.01)

(52) U.S. Cl.
CPC ...... *H04B 17/336* (2015.01); *H04W 72/0453* (2013.01); *H04W 72/541* (2023.01)

(58) Field of Classification Search
CPC ... H04B 17/336; H04B 17/345; H04L 1/0003; H04L 1/0009; H04W 72/0453; H04W 72/541

(Continued)

(56) References Cited

U.S. PATENT DOCUMENTS

2009/0124205 A1* 5/2009 Aboba ................. H04B 17/382 455/63.1
2011/0021153 A1* 1/2011 Safavi ................... H04L 1/0026 455/63.1

(Continued)

FOREIGN PATENT DOCUMENTS

CN 107203782 A 9/2017

OTHER PUBLICATIONS

International Search Report and Written Opinion, Dated Mar. 31, 2023, Application # PCT/US22/82090.

(Continued)

*Primary Examiner* — Natasha W Cosme
(74) *Attorney, Agent, or Firm* — Polsinelli PC

(57) ABSTRACT

One or more aspects of the present disclosure are directed to a software-based solution that can classify interference signals in real-time affecting a radio equipment and provide/implement an interference mitigations scheme to combat the interference signal and restore communication system of the radio equipment. In one aspect, a radio equipment includes memory having computer-readable instructions stored therein and one or more processors. The one or more processors are configured to execute the computer-readable instructions to receive at least one interference signal via an antenna of the radio; determine one or more layers characteristics of one or network layers used for transmission of signals for the radio; classify the interference signal using one or more features in the interference signal and the one or more layers characteristics; and determine an interference mitigation scheme for countering the interference signal.

20 Claims, 10 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2012/0027142 | A1* | 2/2012 | Essebbar .............. | H04B 1/1027 375/350 |
| 2015/0011211 | A1 | 1/2015 | Plestid et al. | |
| 2015/0303950 | A1 | 10/2015 | Shattil | |
| 2019/0274064 | A1 | 9/2019 | Chapman et al. | |
| 2020/0235833 | A1 | 7/2020 | Zhu et al. | |
| 2020/0322960 | A1* | 10/2020 | Monajemi ............ | H04B 17/373 |
| 2020/0351806 | A1 | 11/2020 | Eyuboglu et al. | |
| 2021/0235278 | A1* | 7/2021 | Lu ......................... | H04W 16/18 |

OTHER PUBLICATIONS

Taiwo Oyedare et al.; "Interference Suppression Using Deep Learning: Current Approaches and Open Challenges"; Cornell University Library; Ithaca, New York; c. Dec. 2021; 26 pages.
Shiwen He et al.; "An Overview on the Application of Graph Neural Networks in Wireless Networks", IEEE Open Journal of the Communications Society; vol. 2; c. Nov. 2021; pp. 2547-2565.
Anonymous; "Computational Radio Intelligence: One Key for 66 Wireless"; Dec. 1, 2019 (Dec. 1, 2019); URL:https://www.zte.com.cn/content/dam/zte-site/res-www-zte-com-cn/mediares/magazine/publication/com_en/pdf/en201904.pdf
Supplementary European Search Report issued Feb. 20, 2026 in corresponding European Application No. 22912675.0.

* cited by examiner

COGNITIVE VIRTUAL RADIO ACCESS NETWORK ARCHITECTURE

CROSS REFERENCE TO RELATED APPLICATIONS

The present application claims priority to Provisional Patent Application No. 63/291,849, filed Dec. 20, 2021, and entitled "COGNITIVE VIRTUAL RADIO ACCESS NETWORK ARCHITECTURE DRIVEN BY INTELLIGENT DIRECT DIGITAL TRANSCEIVER FOR OPERATION FROM UHF TO KA BAND," the disclosure of which is hereby incorporated by reference herein in its entirety for all purposes.

TECHNICAL FIELD

The subject matter of this disclosure generally relates to the field of wireless network operations and, more particularly, to a cognitive virtual radio access network with intelligence to perform dynamic interference mitigation.

BACKGROUND

Wireless broadband represents a critical component of economic growth, job creation, and global competitiveness because consumers are increasingly using wireless broadband services to assist them in their everyday lives. Demand for wireless broadband services and the network capacity associated with those services is surging, resulting in the development of a variety of systems and architectures that can meet this demand including, but not limited to, mixed topologies of heterogeneous multi-vendor networks.

SUMMARY

One or more aspects of the present disclosure are directed to a software-based solution implementing a virtualized radio access network functionalities with a cognitive intelligence to perform dynamic interference mitigation.

In one aspect, a device includes memory having computer-readable instructions stored therein and one or more processors. The one or more processors are configured to execute the computer-readable instructions to operate as a virtualized radio access network to receive at least one interference signal via an antenna; classify the interference signal using one or more features in the signal received and one or more network layer characteristics of a modem of the device; and determine an interference mitigation scheme for countering the interference signal based on classification of the interference signal.

In another aspect, the interference mitigation scheme includes switching operation of the device from an existing frequency band to a different frequency band.

In another aspect, the interference mitigation scheme includes applying an updated signal processing function to signals received at the device.

In another aspect, the interference mitigation scheme includes applying an adaptive filter to signals received at the device.

In another aspect, the interference mitigation scheme includes updating one or more modifying a utilized modulation and coding scheme or increasing a transmit power of the device.

In another aspect, the interference mitigation scheme is determined using a trained neural network.

In another aspect, the device is configured to operate as a 5G virtualized radio access network.

In one aspect, one or more non-transitory computer-readable media include computer-readable instructions, which when executed by one or more processors configured to operate as a virtualized radio access network, cause the virtualized radio access network to receive at least one interference signal via an antenna; classify the interference signal using one or more features in the signal received and one or more network layer characteristics of a modem associated with the virtualized radio access network; and determine an interference mitigation scheme for countering the interference signal based on classification of the interference signal.

In one aspect, a method of interference mitigation by a virtualized radio access network includes receiving at least one interference signal via an antenna; classifying the interference signal using one or more features in the signal received and one or more network layer characteristics of a modem associated with the virtualized radio access network; and determining an interference mitigation scheme for countering the interference signal based on classification of the interference signal.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
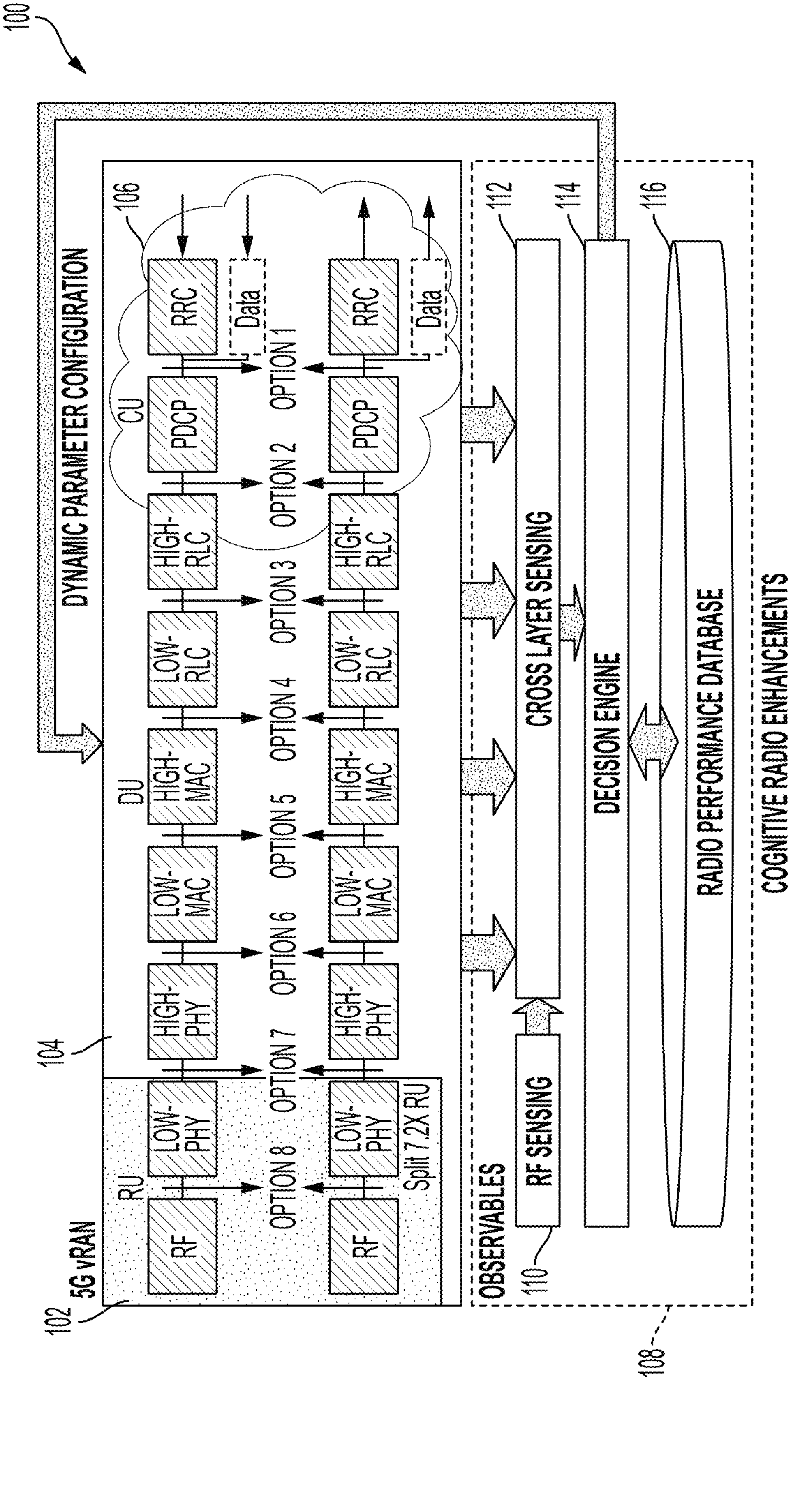
FIG. 1 illustrates an example architecture of a 5G virtual radio access network architecture according to some aspects of the present disclosure.

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The following is a table of acronyms that may be used/referenced throughout the present disclosure.

| Acronyms | |
|---|---|
| API | Application Programming Interface |
| APP | Application or Application Layer |
| CCC | Common Control Channel |
| CCSDS | Consultative Committee for Space Data Systems |
| CLS | Cross Layer Sensing |
| CDE | CLAIRE Decision Engine |
| Comms | Communications |
| DBB | Differential Buffer Backlog |
| DCNN | Deep Convolutional Neural Networks |
| DDTRX | Direct Digital Transceiver |
| ICD | Interface Control Document |
| JSON | JAVA Script Object Notification |
| MAC | Medium Access Control Layer |
| NET | Network Layer |
| NFV | Network Function Virtualization |
| OODA | Observe Orient Decide and Act |
| PF | Packet Forwarding |
| PHY | Physical Layer |
| SADR | Spectrum and Delay Aware Routing |
| SCaN | Space Communications and Navigation |
| SOA | Service Oriented Architecture |
| SON | Self-Organizing Network |
| UHF | Ultra-High Frequency |

To meet the ever-increasing demand for ubiquitous connectivity within all aspects of the operating landscape, resilient high bandwidth communications systems are essential. Recent advances in 5G technologies show great promise in their ability to fulfill increased wireless access needs. Commercial 5G Systems are expected to provide enhanced Mobile Broadband (eMBB), ultra-reliable and Low Latency Communications (uRLLC) and massive Machine-type Communications (mMTC). While these attributes are desirable for non-commercial communications (e.g., military applications and/or otherwise sensitive communications), there are many short-falls in leveraging commercial 5G systems, as is, for Tactical Communications. Some of these short-falls of traditional 5G Systems consists of 1. Limited Spectrum Access (e. g. access to some commercial spectrum bands only), 2. No spectrum and network awareness. Hence no cognition, 3. Poor interference resilience, 4. Difficult to provide uRLLC since Multi-Access Edge Compute (MEC) is likely to be in the Cloud.

FIG. 1 illustrates an example architecture of a 5G virtual radio access network architecture according to some aspects of the present disclosure.

WADER Architecture can apply to any radio equipment or any device having a radio capable of transmitting and/or receiving information using any waveform to make it more robust and resilient.

Components of 5G Virtual Radio Access Network (vRAN) 100 may include a Radio Unit (RU) 102, a Distributed Unit (DU) 104, and a Centralized Unit (CU) 106, each of which may operate according to known or to be developed available 5G vRANs. Each of RU 102, DU 104, and CU 106 may further include Low Physical Layer (Low-PHY), High-PHY, Low Medium Access Control (Low MAC), High-MAC, Low Radio Link Control (Low-RLC), High-RLC, Packet Data Convergence Protocol (PDCP) and Radio Resource Controller (RRC).

Additionally, 5G vRAN 100 may include a cognitive enhancement component 108. Cognitive enhancement component 108 may include an RF sensing component 110, a Cross Layer Sensing (CLS) component 112, a decision engine 114, and a radio performance database 116.

Inputs from distributed unit 104 and/or centralized unit 106 may be received on which CLS may be performed by CLS component 112.

By adding Wide-band (e.g., UHF-Ka Band) RF and Cross Layer Sensing (CLS) across different network layers of a modem associated with vRAN 100 (not shown) to detect and characterize adversary Electronic Warfare (EW) and interference patterns, cognitive enhancement component 108 adds a layer of intelligence for band selection to any radio equipment that utilized 5G vRAN architecture 100. Decision engine 114 can select an optimal technique to counter any interference and configures the parameters of the 5G vRAN System based on radio performance database 116. RF and Cross Layer Sensing is also used to self-control the 5G RF Signature to avoid interference with other systems (e. g. Radar operating in the same band) and to control the RF signature. RF sensing, interference classification, and/or mitigation may be performed according to processes described in U.S. application Ser. No. 18/069,114, titled "Waveform Agnostic Learning-Enhanced Decision Engine For Any Radio," filed on Dec. 20, 2022, the entire content of which is incorporated herein by reference.

Figure 2:
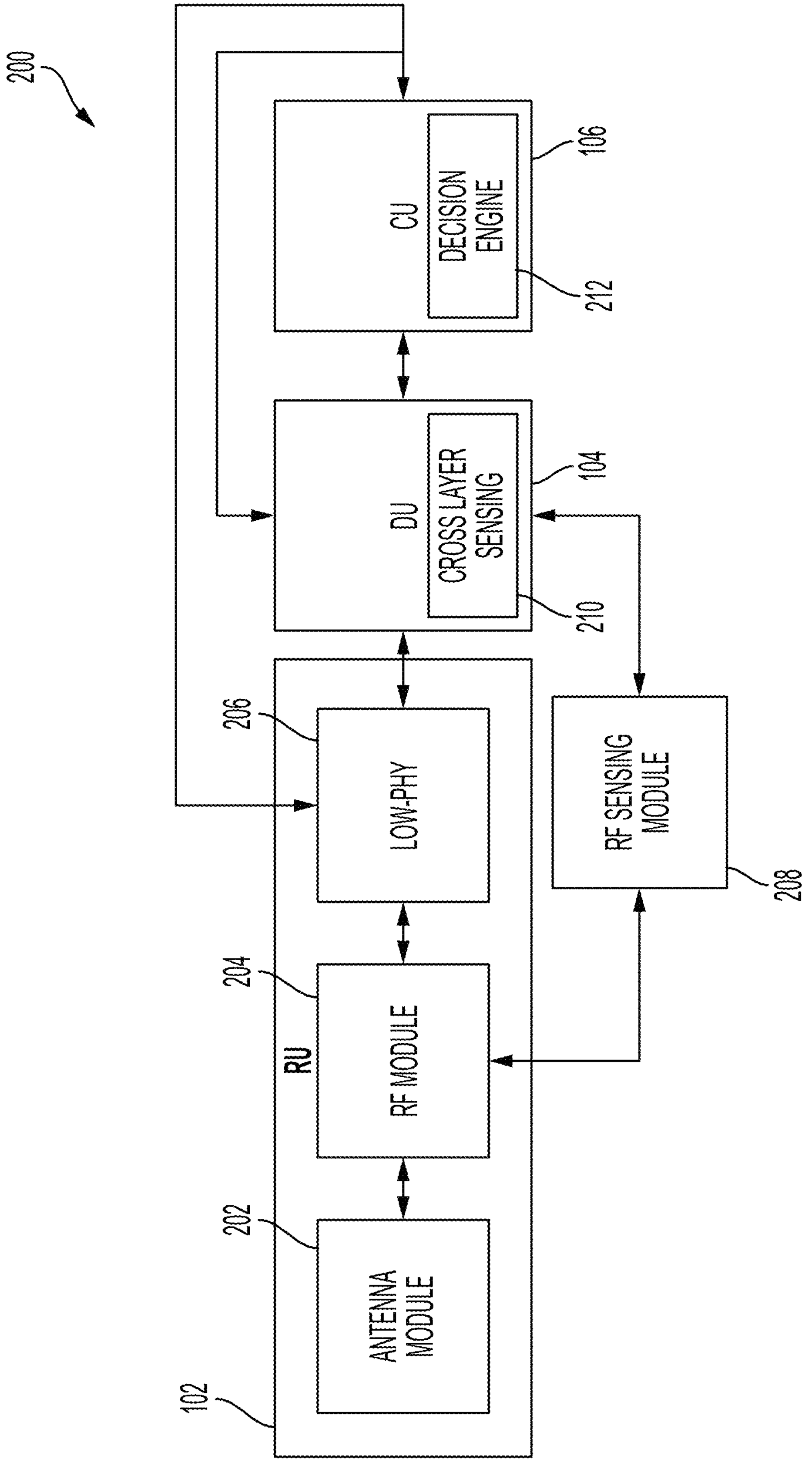
FIG. 2 provides another example architecture for a vRAN according to some aspects of the present disclosure.

FIG. 2 provides another example architecture for a vRAN according to some aspects of the present disclosure.

Architecture 200 provides some further understanding of example cognitive vRANs of the present disclosure where an antenna module 202 may be connected to RF module 204 inside RU 102, which may be connected to Low-PHY 206 which in turn is connected to DU 104 and/or CU 106.

RF sensing module 208 (which may be the same as RF sensing component 110 of FIG. 1) may be connected to the RF module 204 and can obtain the real and imaginary samples representative of the external Radio Frequency (RF) environment. CLS module 210 (which may be the same as CLS component 112 of FIG. 1) may be incorporated into DU 104 and decision engine 212 (which may be the same as decision engine 114 of FIG. 1) may be incorporated into CU 106. In one example, the decision may be incorporated into a RRC of a device (not shown).

RF module 204 may be implemented using a Direct Digital Transceiver (DDTRX) technology along with the virtualized New Radio baseband Distributed Unit (vDU) functionality implemented as software. The DDTRX will allow RF sensing module 208 to search through the spectrum from Ultra High Frequency (UHF) to the Ka Band. RD sensing module 208 can perform in-band search to see if there are any interfering signals as well as a search for un-used, or white spaces to move to, in case there is an interference that is detected. CLS module 210 along with decision engine 212 can Detect and Characterize (D&C) wide variety of signals present across UHF-Ka Bands, identify white spaces where the 5G vRAN 200 can operate. Furthermore, RF and CLS will D&C variety of interference types and orchestrate techniques such as Dynamic Spectrum Access (DSA), Notch Filtering (NF), Spectral Honeypot (SH) to mitigate interference.

Therefore, example cognitive vRANs disclosed herein can provide Robust and Interference Resilient Tactical Communications, SIGINT, Tactical Edge Compute as well as Extreme Bandwidth Low Probability of Detection Communications by replacing 5G OFDM with an alternate Waveform.

Figure 3:
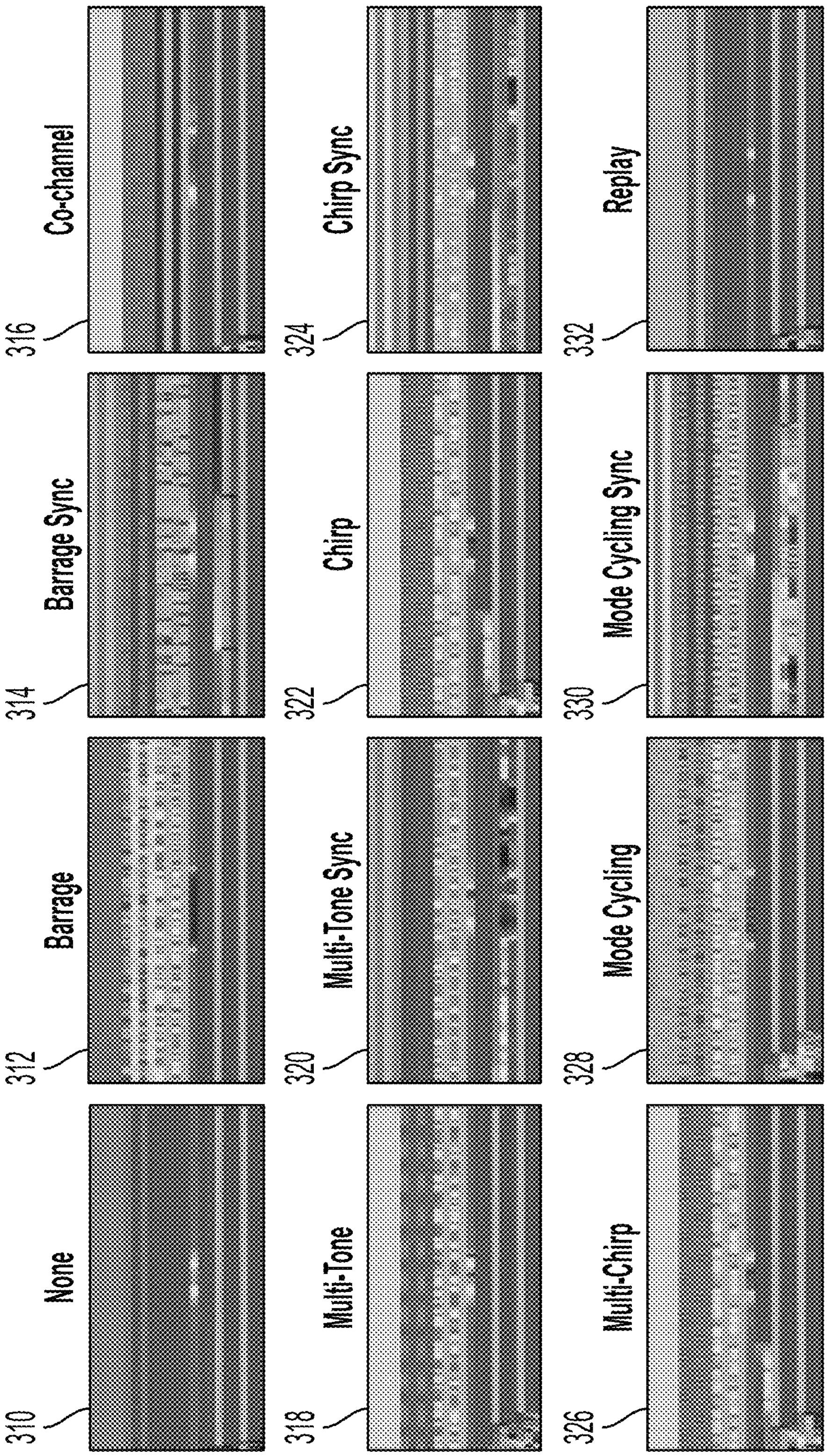
FIG. 3 shows example feature matrices that combine RF and CLS information according to some aspects of the present disclosure.

In one example, D&C can be performed using trained neural networks. FIG. 3 shows example feature matrices that combine RF and CLS information according to some aspects of the present disclosure.

FIG. 3 illustrates example feature matrices 310, 312, 314, 316, 318, 320, 322, 324, 326, 328, 330, and 332, each of which is associated with a different interference class as indicated in FIG. 3. In one example, these feature matrices may then be provided to a Deep Convolutional Neural Network (DCNN) to Detect and Characterize the interference type. D&C may be performed according to example embodiments described in U.S. application Ser. No. 18/069,114, titled "Waveform Agnostic Learning-Enhanced Decision Engine For Any Radio," filed on Dec. 20, 2022, the entire content of which is incorporated herein by reference.

Figure 4:
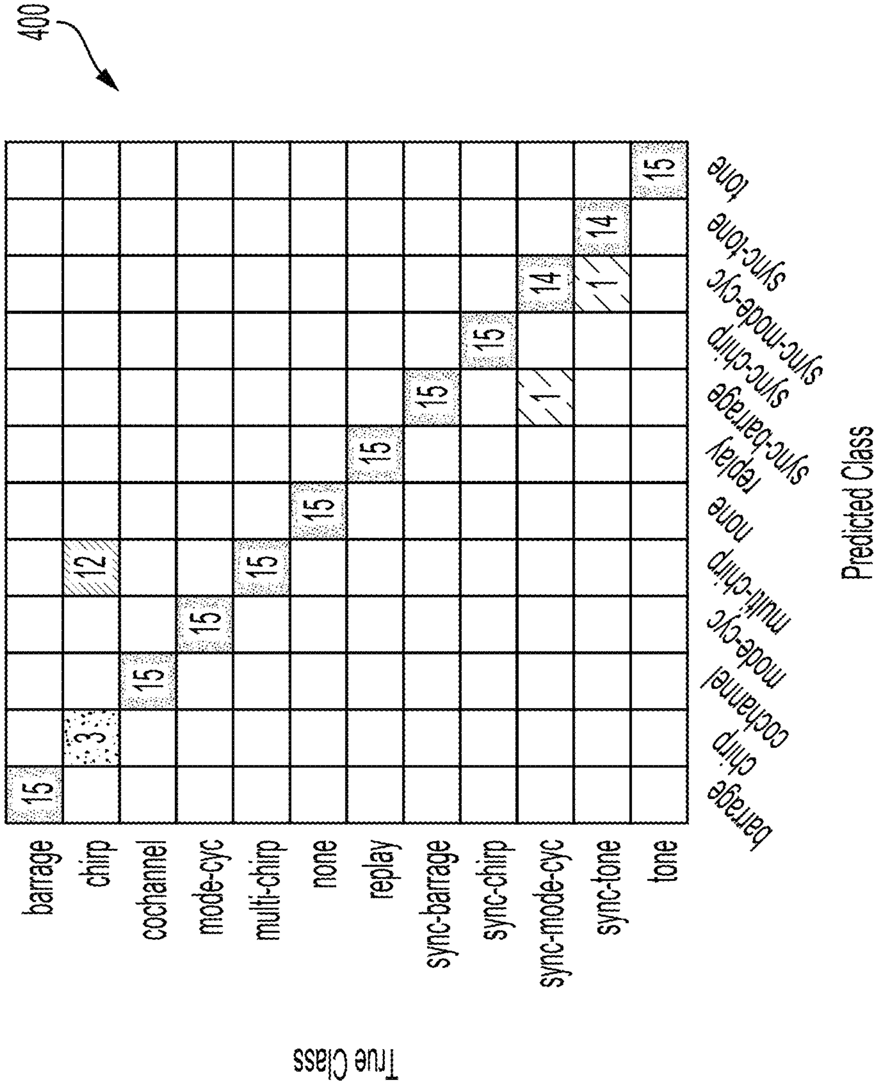
FIG. 4 illustrates an example confusion matrix of DCNN according to some aspects of the present disclosure.

FIG. 4 illustrates an example confusion matrix of DCNN according to some aspects of the present disclosure. Output 400 shows indicates an accurate Detection and Characterization of a wide variety of interference types by the utilized DCNN.

Detecting and classifying forms of interference can include feeding the received features into a DCNN used by decision engine 212. The set of features can be divided into cross layer sensing features including, but not limited to, BER, RSSI, Signal to Interference plus Noise Ratio (SINR) values, and Cyclostationary Signal Processing (CSP) features which include the Power Spectral Density (PSD), detected tones, and spectral correlation function, both conjugate and non-conjugate, and spectral coherence values, both conjugate and non-conjugate, etc.

In one example, the normalized features are fed directly into the deep neural networks. Using DCNN that is trained to receive the normalized features and provide a classification for the interference as output a classification for the detected interference signal. The output of classification component 206 may then be fed into decision engine 212, which may also utilize machine learning techniques and one or more trained neural networks to identify an interference mitigation strategy to restore performance of communication system(s), as described per step 512 of FIG. 5.

Deep Learning based on which DCNN operates is one where the learning happens in successive layers with each layer of the neural network adding to the knowledge of the previous layer without human intervention. Various known or to be developed deep learning techniques may be utilized to train classification component 206 for classifying interference signals.

The performance of a learned model can be measured by simple prediction accuracy or by the business metric the learned model is designed to support. Performance depends on the degree to which the training data matches the real world, the choice of algorithm, the algorithm's parameters, and the quantity of data. Unsupervised machine learning is another variation of machine learning where algorithms detect and discern attributes and features without the benefit of labeled training data. Some algorithms cluster data into meaningful groups by finding centers of data density. Other unsupervised algorithms use dimensionality reduction techniques (such as Singular-Value Decomposition—SVD) to uncover the essential attributes of the data without requiring a human to define those attributes in advance. This is particularly useful for "unstructured" data, such as images or text, where an underlying structure can be automatically inferred, enabling other algorithms to leverage the data. One advantageous aspect of deep learning is lack of manual intervention, which improves the accuracy of results. Trained neural networks utilized in the concepts described herein can be based on unsupervised, supervised, and/or reinforcement deep learning techniques.

Once the type of interference is identified and classified, an interference mitigations scheme may be determined to avoid the interference. As an example, if the detected interference is of the type Barrage, and it is degrading the performance of the Radios, then vRAN 100/200 and/or the network of User Equipment (UEs) may be moved to the unused frequency band, or white spaces.

If a tone interference is detected, then new signal processing functions may be added to Low-PHY and a High-PHY which can suppress the tone interference. If a chirp interference is detected, then such an interference may be tracked and excised using adaptive filter that may be incorporated in the Low-PHY or High-PHY. Such filters may be implemented using Recursive Least Squares (RLS) or Kalman Filters technique.

If the interference is not strong enough and is not completely degrading the communications as measured through parameters such as Reference Signal Received Power (RSRP), Signal to Interference plus Noise Ratio (SINR), Bit Error Rate (BER), Packet Error Rate (PER) etc., then the decision engine 212 may decide to move to a Modulation and Coding scheme that is more robust OR boost the transmit power of its associated antenna.

Figure 5:
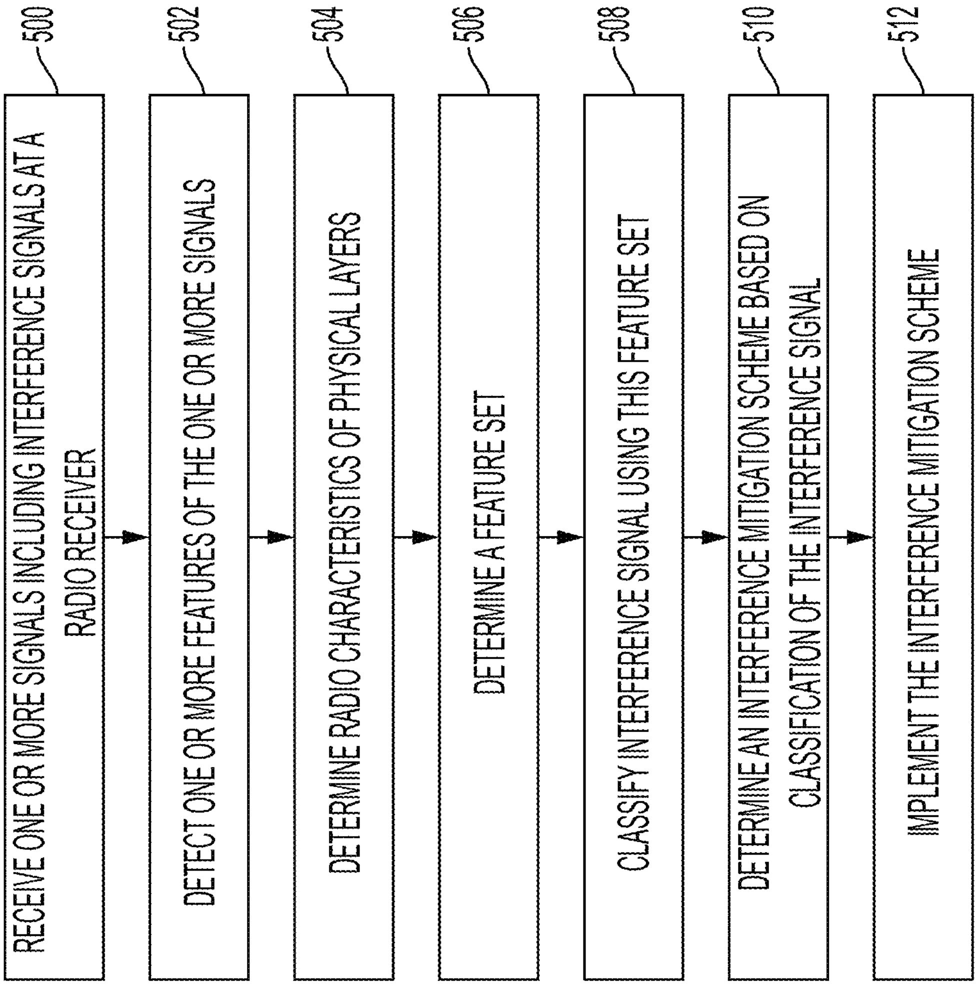
FIG. 5 illustrates an example process of classifying and mitigating an interference signal according to some aspects of the present disclosure.

FIG. 5 illustrates an example process of classifying and mitigating an interference signal according to some aspects of the present disclosure. Steps of FIG. 5 may be performed by vRAN 100/200 and/or various components thereof as described above with reference to FIG. 1.

At step 500, the method includes receiving one or more signals at a receiver (transceiver) of a radio such as RU 102. As noted above, the radio can be any radio or device capable of receiving RF signals over one or more frequency bands. The one or more signals may include signals containing data intended to be received by the radio and one or more interference signals.

At step 502, the method includes detecting (determining) one or more features in the one or more signals. In one example, the one or more features may be detected based on RF sensing as performed by RF sensing component 110 and/or RF sensing module 208.

At step 504, the method includes determining one or more radio characteristics (inter-layer characteristics or simply layer characteristics) of one or more network layers (e.g., PHY, MAC, and NET), which may be performed by CLS component 112 and/or CLS module 210.

At step 506, the method includes creating (determining) a feature set using the one or more features detected at step 502 along with one or more radio characteristics determined at step 704. In one example, this process may be performed by CLS component 112 and/or CLS module 210 as described above.

At step 508, the method includes classifying an interference signal using the feature set. As described above, decision engine 114 and/or decision engine 212 may utilize deep learning and one or more trained neural networks to classify the interference signal.

At step 510, the method includes determining an interference mitigation scheme for combating the interference signal and restoring the performance of the radio. In one example, the interference mitigation scheme maybe determined by decision engine 114 and/or decision engine 212 using the classified interference signal as input. As noted above, decision engine 114 and/or decision engine 212 may utilize one or more trained neural networks to determine the interference mitigation scheme.

At step 512, the method includes implementing the interference mitigation scheme. As described above, once the type of interference is identified and classified, an interference mitigations scheme may be determined to avoid the interference. As an example, if the detected interference is of the type Barrage, and it is degrading the performance of the Radios, then vRAN 100/200 and/or the network of UEs may be moved to the unused frequency band, or white spaces.

If a tone interference is detected, then new signal processing functions may be added to Low-PHY and a High-PHY which can suppress the tone interference. If a chirp interference is detected, then such an interference may be tracked and excised using adaptive filter that may be incorporated in the Low-PHY or High-PHY. Such filters may be implemented using RLS or Kalman Filters technique.

If the interference is not strong enough and is not completely degrading the communications as measured through parameters such as RSRP, SINR, Bit Error Rate (BER), PER etc., then the decision engine 212 may decide to move to a Modulation and Coding scheme that is more robust OR boost the transmit power of its associated antenna.

Accordingly, interference mitigation schemes implemented can be performed in real-time and in a dynamic fashion that adapts to the nature (classification) of the detected interference signal.

Figure 6:
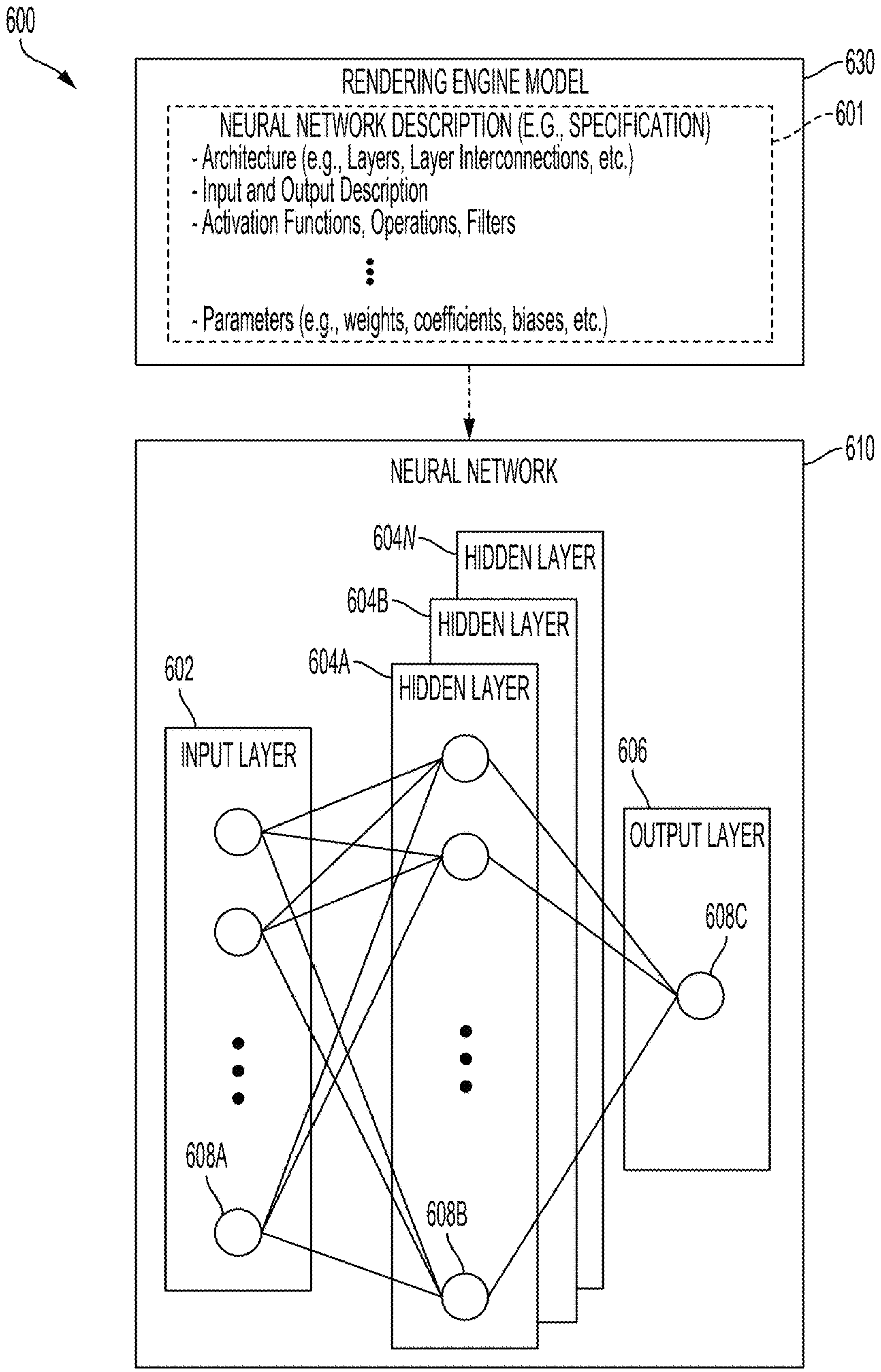
FIG. 6 illustrates an example neural network that can be trained to perform interference signal detection and classification, and/or interference mitigation scheme according to some aspects of the present disclosure.

FIG. 6 illustrates an example neural network that can be trained to perform interference signal detection and classification, and/or interference mitigation scheme according to some aspects of the present disclosure.

Architecture 600 includes a neural network 610 defined by an example neural network description 601 in rendering engine model (neural controller) 630. Neural network description 601 can include a full specification of neural network 610. For example, neural network description 601 can include a description or specification of the architecture of neural network 610 (e.g., the layers, layer interconnections, number of nodes in each layer, etc.); an input and output description which indicates how the input and output are formed or processed; an indication of the activation functions in the neural network, the operations or filters in the neural network, etc.; neural network parameters such as weights, biases, etc.; and so forth.

In this example, neural network 610 includes an input layer 602, which can receive input data including, but not limited to, information on RF sensing, radio characteristics on PHY, MAC, NET layers, radio performance measurements, etc., in the example of using network 610 for interference detection and classification.

In the example of using network 610 for interference mitigation, input layer can receive information related to classification of detected interference(s).

Neural network 610 includes hidden layers 604A through 604N (collectively "604" hereinafter). Hidden layers 604 can include n number of hidden layers, where n is an integer greater than or equal to one. The number of hidden layers can include as many layers as needed for a desired processing outcome and/or rendering intent. Neural network 610 further includes an output layer 606 that provides as output, predicted classification of interference(s) received when network 610 is utilized for interference detection and classification. When using network 610 for determining an interference mitigation scheme, output layer 606 can output an interference mitigation scheme.

Neural network 610 in this example is a multi-layer neural network of interconnected nodes. Each node can represent a piece of information. Information associated with the nodes is shared among the different layers and each layer retains information as information is processed. In some cases, neural network 610 can include a feed-forward neural network, in which case there are no feedback connections where outputs of the neural network are fed back into itself.

In other cases, neural network 610 can include a recurrent neural network, which can have loops that allow information to be carried across nodes while reading in input.

Information can be exchanged between nodes through node-to-node interconnections between the various layers. Nodes of input layer 602 can activate a set of nodes in first hidden layer 604A. For example, as shown, each of the input nodes of input layer 602 is connected to each of the nodes of first hidden layer 604A. The nodes of hidden layer 604A can transform the information of each input node by applying activation functions to the information. The information derived from the transformation can then be passed to and can activate the nodes of the next hidden layer (e.g., 604B), which can perform their own designated functions. Example functions include convolutional, up-sampling, data transformation, pooling, and/or any other suitable functions. The output of the hidden layer (e.g., 604B) can then activate nodes of the next hidden layer (e.g., 604N), and so on. The output of the last hidden layer can activate one or more nodes of output layer 606, at which point an output is provided. In some cases, while nodes (e.g., nodes 608A, 608B, 608C) in neural network 610 are shown as having multiple output lines, a node has a single output and all lines shown as being output from a node represent the same output value.

In some cases, each node or interconnection between nodes can have a weight that is a set of parameters derived from training neural network 610. For example, an interconnection between nodes can represent a piece of information learned about the interconnected nodes. The interconnection can have a numeric weight that can be tuned (e.g., based on a training dataset), allowing neural network 610 to be adaptive to inputs and able to learn as more data is processed.

Neural network 610 can be pre-trained to process the features from the data in the input layer 602 using the different hidden layers 604 in order to provide the output through output layer 606. In an example in which neural network 610 is used to predict usage of the shared band, neural network 610 can be trained using training data that includes past transmissions and operation in the shared band by the same UEs or UEs of similar systems (e.g., Radar systems, RAN systems, etc.). For instance, past transmission information can be input into neural network 610, which can be processed by neural network 610 to generate outputs which can be used to tune one or more aspects of neural network 610, such as weights, biases, etc.

In some cases, neural network 610 can adjust weights of nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training media data until the weights of the layers are accurately tuned.

For a first training iteration for neural network 610, the output can include values that do not give preference to any particular class due to the weights being randomly selected at initialization. For example, if the output is a vector with probabilities that the object includes different product(s) and/or different users, the probability value for each of the different product and/or user may be equal or at least very similar (e.g., for ten possible products or users, each class may have a probability value of 0.1). With the initial weights, neural network 610 is unable to determine low level features and thus cannot make an accurate determination of what the classification of the object might be. A loss function can be used to analyze errors in the output. Any suitable loss function definition can be used.

The loss (or error) can be high for the first training dataset (e.g., images) since the actual values will be different than the predicted output. The goal of training is to minimize the amount of loss so that the predicted output comports with a target or ideal output. Neural network 610 can perform a backward pass by determining which inputs (weights) most contributed to the loss of neural network 610, and can adjust the weights so that the loss decreases and is eventually minimized.

A derivative of the loss with respect to the weights can be computed to determine the weights that contributed most to the loss of neural network 610. After the derivative is computed, a weight update can be performed by updating the weights of the filters. For example, the weights can be updated so that they change in the opposite direction of the gradient. A learning rate can be set to any suitable value, with a high learning rate including larger weight updates and a lower value indicating smaller weight updates.

Neural network 610 can include any suitable neural or deep learning network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. In other examples, neural network 610 can represent any other neural or deep learning network, such as an autoencoder, a deep belief nets (DBNs), a recurrent neural networks (RNNs), etc.

Figure 7A:
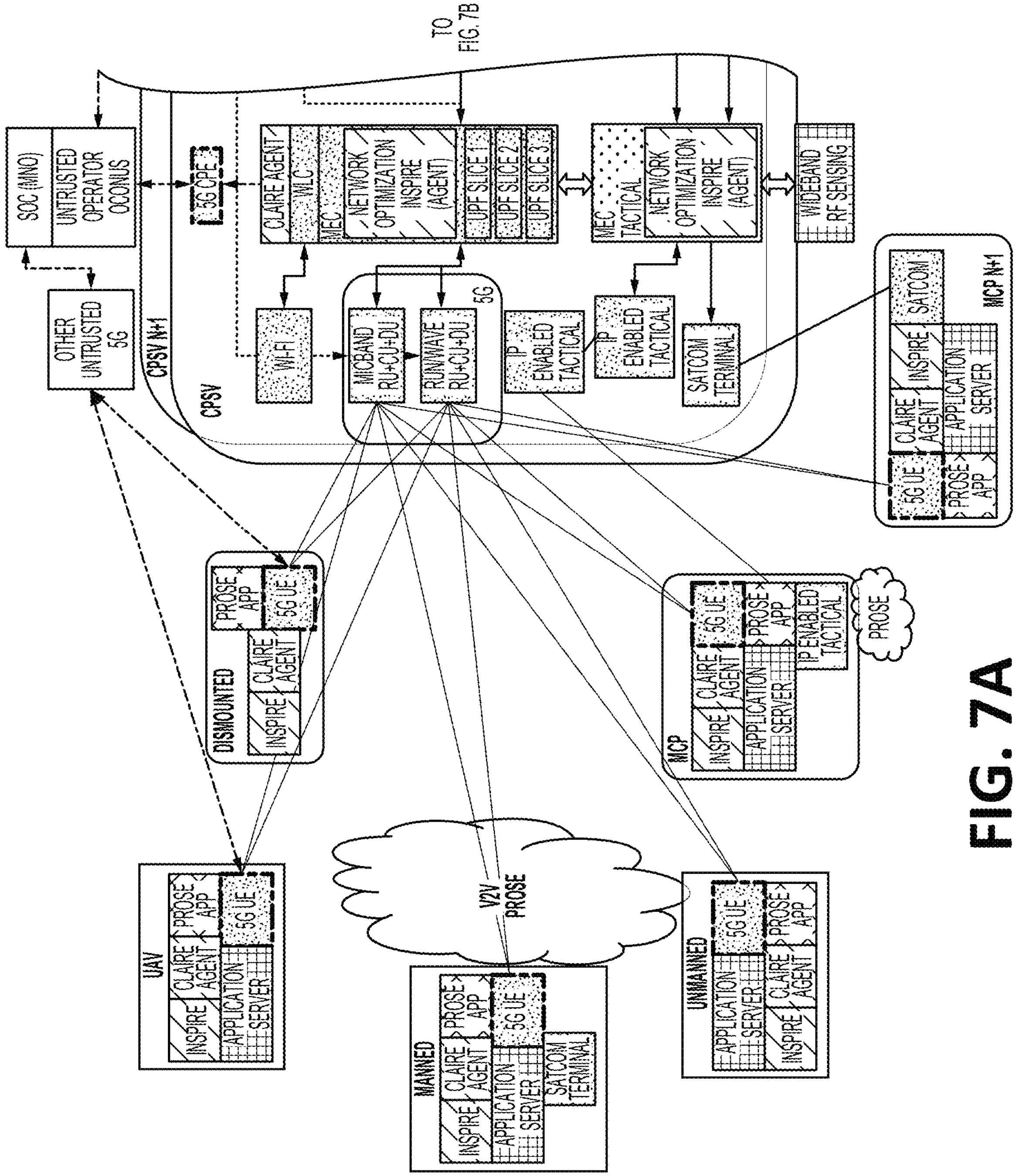
FIG. 7 illustrates an overall system architecture in which the cognitive vRAN of the present disclosure may be utilized according to some aspects of the present disclosure.
Figure 7B:
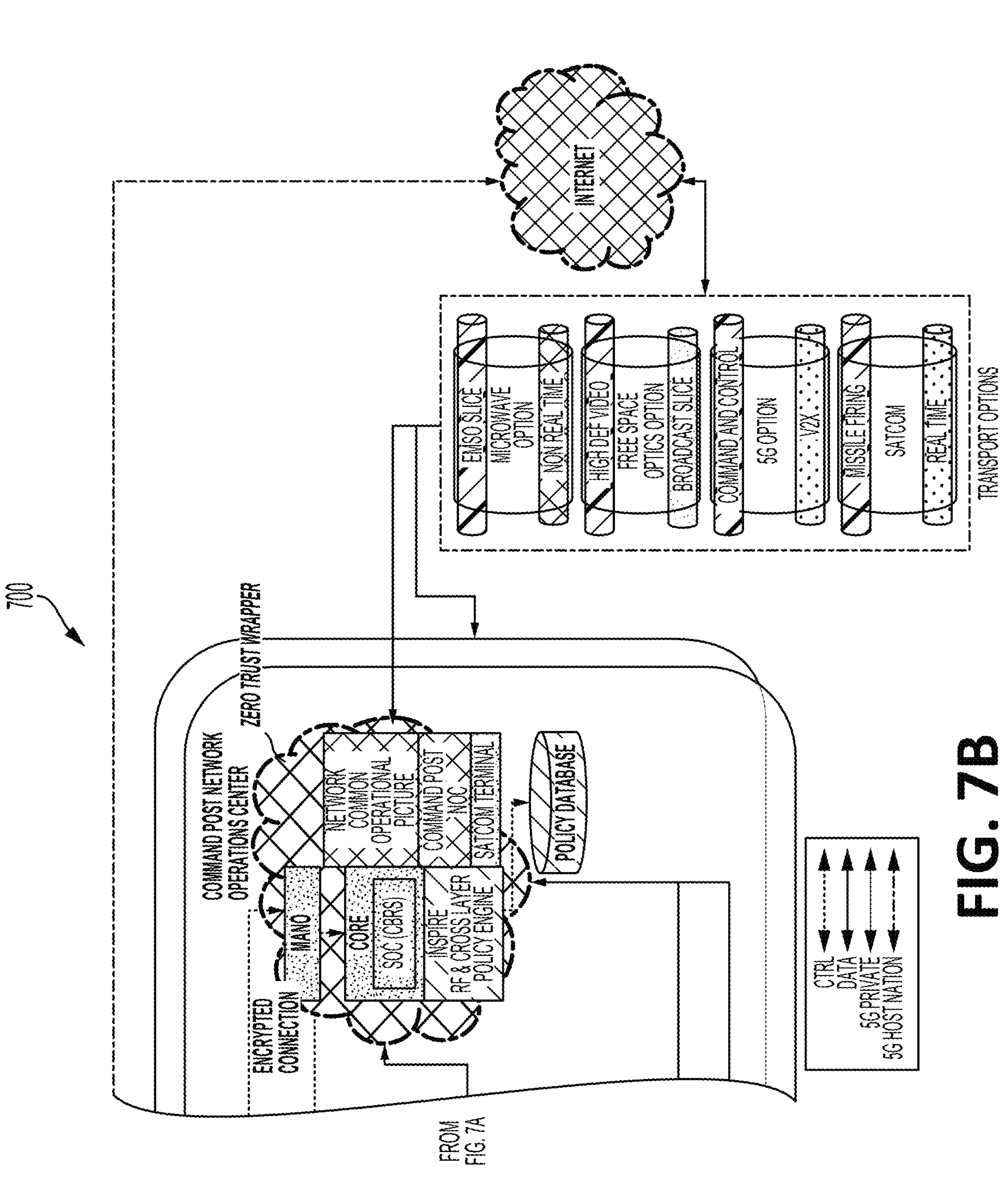

FIG. 7 illustrates an overall system architecture in which the cognitive vRAN of the present disclosure may be utilized according to some aspects of the present disclosure.

Architecture 700 of FIG. 7 shows the complete systems architecture of a 5G vRAN system operating along-side Wi-Fi, Satellite Communications (SATCOM) and even Tactical Communications. CLS and DE capabilities may manifest as CLAIRE and INSPiRE modules described in U.S. patent application Ser. No. 17/933,452, titled "System And Method For Interference Mitigation And Congestion Control Through Cross Layer Cognitive Communications And Intelligent Routing," filed on Sep. 19, 2022, and U.S. application Ser. No. 18/069,157 titled "Intelligent Network Slicing and Policy-Based Routing Engine," filed on Dec. 20, 2022, the entire content of which are incorporated herein by reference. CLAIRE and INSPiRE modules may maintain high Quality of Service (QoS) for a given link while ensuring a QoS of the network. QoS may be defined in terms of BER, PER, Throughput and Latency.

Architecture 700 also shows that an INSPiRE engine may be situated within the Cloud or on the Multi-access Edge Compute (MEC) Node. CLAIRE and INSPiRE make a decision on interference mitigation strategy and also routing decisions to find alternate ways of bypassing the interference. In some examples, some non-sensitive packets of information are made to flow through some other untrusted commercial network, while sensitive information and command and control packets are made to flow through the private network.

Figure 8:
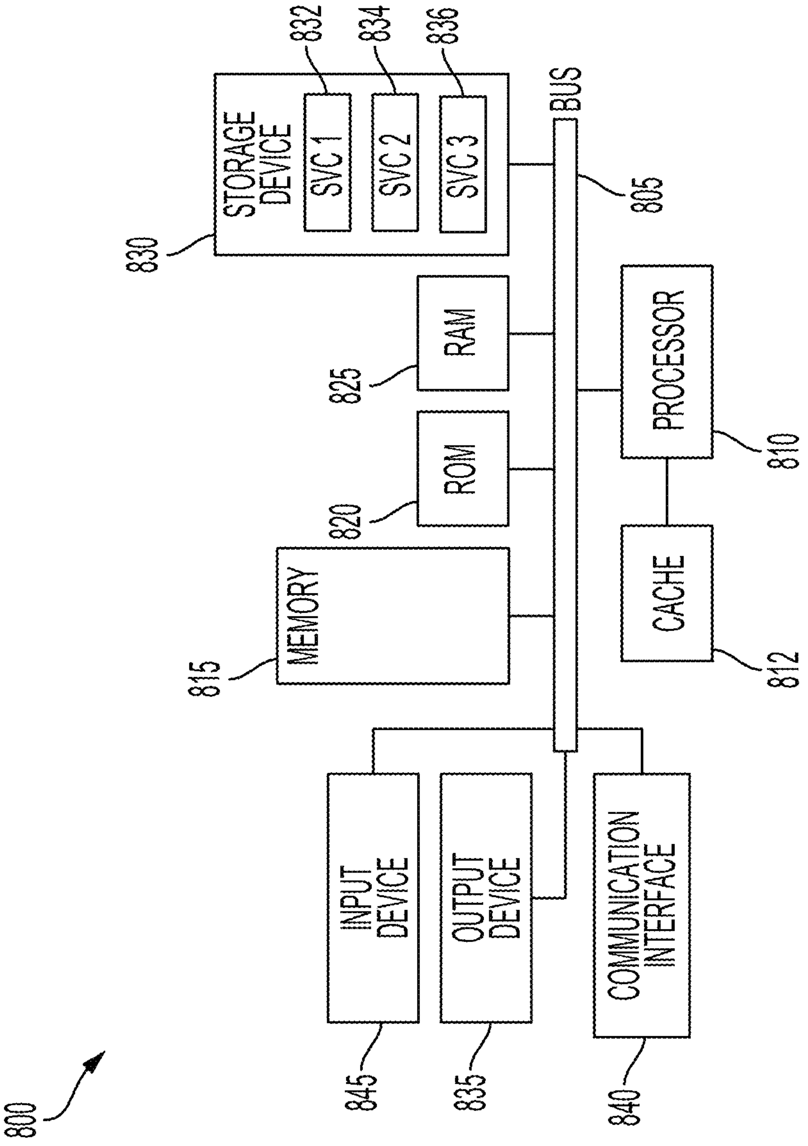
FIG. 8 illustrates an example network device according to some aspects of the present disclosure.

FIG. 8 illustrates an example network device according to some aspects of the present disclosure. Example of computing system 800 of FIG. 8 can be used to implement one or more component of the example systems and architectures described above with reference to FIGS. 1-10 including, but not limited to, any component of WADER architecture 100 of FIG. 1. Connection 805 can be connection connecting various components of the computing system 800. For example, connection 805 can a physical connection via a bus, or a direct connection into processor 810, such as in a chipset architecture. Connection 805 can also be a virtual connection, networked connection, or logical connection.

In some embodiments computing system 800 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, such as read only memory (ROM) 820 and random access memory (RAM) 825 to processor 810. Computing system 800 can include a cache of high-speed memory 812 connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 can essentially be a completely self-contained computing system, containing multiple cores or processors, a bus, memory controller, cache, etc. A multi-core processor can be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement and therefore the basic features here can easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

Figure 9:
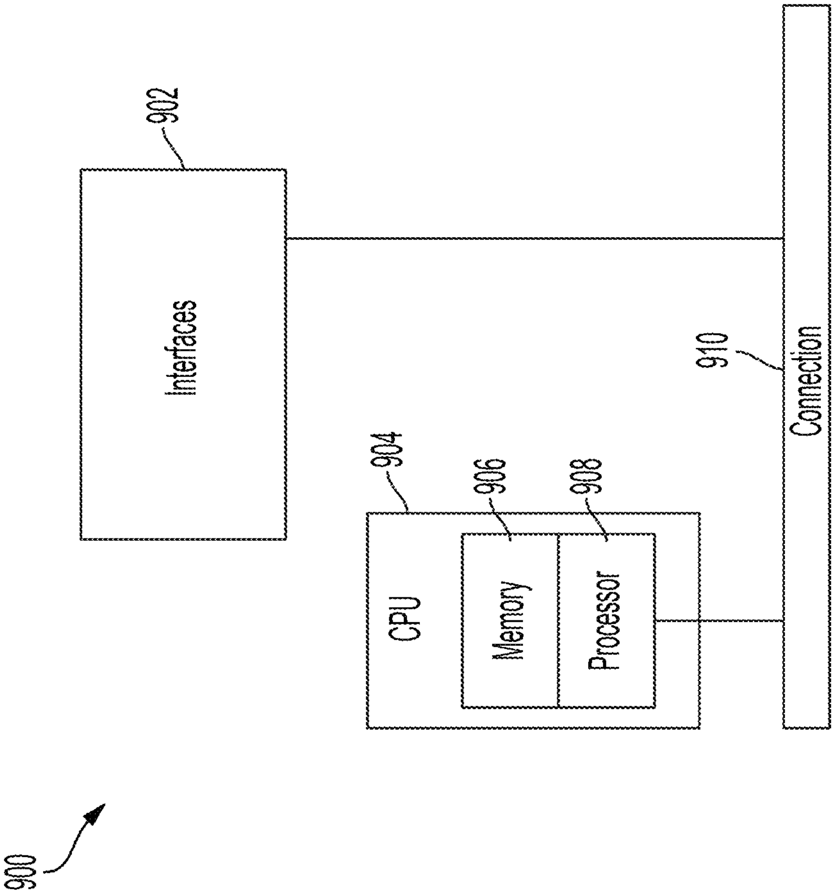
FIG. 9 shows an example of a computing system according to some aspects of the present disclosure.

FIG. 9 illustrates an example network device 900 suitable for performing switching, routing, load balancing, and other networking operations. The example network device 900 can be implemented as switches, routers, nodes, metadata servers, load balancers, client devices, and so forth.

Network device 900 includes a central processing unit (CPU) 904, interfaces 902, and a bus 910 (e.g., a PCI bus). When acting under the control of appropriate software or firmware, the CPU 904 is responsible for executing packet management, error detection, and/or routing functions. The CPU 904 preferably accomplishes all these functions under the control of software including an operating system and any appropriate applications software. CPU 904 can include one or more processors 908, such as a processor from the INTEL X86 family of microprocessors. In some cases, processor 908 can be specially designed hardware for controlling the operations of network device 900. In some cases, a memory 906 (e.g., non-volatile RAM, ROM, etc.) also forms part of CPU 904. However, there are many different ways in which memory could be coupled to the system.

The interfaces 902 are typically provided as modular interface cards (sometimes referred to as "line cards"). Generally, they control the sending and receiving of data packets over the network and sometimes support other peripherals used with the network device 900. Among the interfaces that can be provided are Ethernet interfaces, frame relay interfaces, cable interfaces, DSL interfaces, token ring interfaces, and the like. In addition, various very high-speed interfaces can be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces can include ports appropriate for communication with the appropriate media. In some cases, they can also include an independent processor and, in some instances, volatile RAM. The independent processors can control such communications intensive tasks as packet switching, media control, signal processing, crypto processing, and management. By providing separate processors for the communication intensive tasks, these interfaces allow the master CPU (e.g., 904) to efficiently perform routing computations, network diagnostics, security functions, etc.

Although the system shown in FIG. 9 is one specific network device of the present disclosure, it is by no means the only network device architecture on which the present disclosure can be implemented. For example, an architecture having a single processor that handles communications as well as routing computations, etc., is often used. Further, other types of interfaces and media could also be used with the network device 900.

Regardless of the network device's configuration, it can employ one or more memories or memory modules (including memory 906) configured to store program instructions for the general-purpose network operations and mechanisms for roaming, route optimization and routing functions described herein. The program instructions can control the operation of an operating system and/or one or more applications, for example. The memory or memories can also be configured to store tables such as mobility binding, registration, and association tables, etc. Memory 906 could also hold various software containers and virtualized execution environments and data.

The network device 900 can also include an application-specific integrated circuit (ASIC), which can be configured to perform routing and/or switching operations. The ASIC can communicate with other components in the network device 900 via the bus 910, to exchange data and signals and coordinate various types of operations by the network device 900, such as routing, switching, and/or data storage operations, for example.

For clarity of explanation, in some instances the present technology can be presented as including individual functional blocks including functional blocks comprising devices, device components, steps or routines in a method embodied in software, or combinations of hardware and software.

Any of the steps, operations, functions, or processes described herein can be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter can have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

The invention claimed is:

1. A device comprising:

a memory having computer-readable instructions stored therein; and one or more processors configured to execute the computer-readable instructions stored on the memory to operate as a virtualized radio access network to:

receive at least one interference signal via an antenna;

detect one or more features of the at least one interference signal;

determine one or more inter-layer characteristics of a plurality of network layers of a modem of the device;

generate a feature set including the one or more features and the one or more inter-layer characteristics;

classify, using a trained neural network, the at least one interference signal as one of a plurality of interference classes based on the feature set; and select, using a decision engine, an interference mitigation scheme from a plurality of interference mitigation schemes associated with the plurality of interference classes to counter the at least one interference signal based on classification of the at least one interference signal.

2. The device of claim 1, wherein the interference mitigation scheme includes switching operation of the device from an existing frequency band to a different frequency band.

3. The device of claim 1, wherein the interference mitigation scheme includes applying an updated signal processing function to signals received at the device.

4. The device of claim 1, wherein the interference mitigation scheme includes applying an adaptive filter to signals received at the device.

5. The device of claim 1, wherein the interference mitigation scheme includes one or more of modifying a utilized modulation and coding scheme or increasing a transmit power of the device.

6. The device of claim 1, wherein the trained neural network comprises a multi-layer neural network having an input layer configured to receive the feature set and an output layer configured to output the classification of the at least one interference signal.

7. The device of claim 1, wherein the device is configured to operate as a 5G virtualized radio access network.

8. One or more non-transitory computer-readable media comprising computer-readable instructions, which when executed by one or more processors configured to operate as a virtualized radio access network, cause the virtualized radio access network to:

receive at least one interference signal via an antenna;

detect one or more features of the at least one interference signal;

determine one or more inter-layer characteristics of a plurality of network layers of a modem associated with the virtualized radio access network;

generate a feature set including the one or more features and the one or more inter-layer characteristics;

classify, using a trained neural network, the at least one interference signal as one of a plurality of interference classes based on the feature set; and select, using a decision engine, an interference mitigation scheme from a plurality of interference mitigation schemes associated with the plurality of interference classes to counter the at least one interference signal based on classification of the at least one interference signal.

9. The one or more non-transitory computer-readable media of claim 8, wherein the interference mitigation scheme includes switching operation of a device from an existing frequency band to a different frequency band.

10. The one or more non-transitory computer-readable media of claim 8, wherein the interference mitigation scheme includes applying an updated signal processing function to signals received at a device associated with the virtualized radio access network.

11. The one or more non-transitory computer-readable media of claim 8, wherein the interference mitigation scheme includes applying an adaptive filter to signals received at a device associated with the virtualized radio access network.

12. The one or more non-transitory computer-readable media of claim 8, wherein the interference mitigation scheme includes one or more of modifying a utilized modulation and coding scheme or increasing a transmit power of a device associated with the virtualized radio access network.

13. The one or more non-transitory computer-readable media of claim 8, wherein the trained neural network comprises a multi-layer neural network having an input layer configured to receive the feature set and an output layer configured to output the classification of the at least one interference signal.

14. The one or more non-transitory computer-readable media of claim 8, wherein the virtualized radio access network is a 5G virtualized radio access network.

15. A method of interference mitigation by a virtualized radio access network, the method comprising:

receiving at least one interference signal via an antenna;

detecting one or more features of the at least one interference signal;

determining one or more inter-layer characteristics of a plurality of network layers of a modem associated with the virtualized radio access network;

generating a feature set including the one or more features and the one or more inter-layer characteristics;

classifying, using a trained neural network, the at least one interference signal as one of a plurality of interference classes based on the feature set; and selecting, using a decision engine, an interference mitigation scheme from a plurality of interference mitigation schemes associated with the plurality of interference classes to counter the at least one interference signal based on classification of the at least one interference signal.

16. The method of claim 15, wherein the interference mitigation scheme includes switching operation of a device from an existing frequency band to a different frequency band.

17. The method of claim 15, wherein the interference mitigation scheme includes applying an updated signal processing function to signals received at a device associated with the virtualized radio access network.

18. The method of claim 15, wherein the interference mitigation scheme includes applying an adaptive filter to signals received at a device associated with the virtualized radio access network.

19. The method of claim 15, wherein the interference mitigation scheme includes one or more of modifying a utilized modulation and coding scheme or increasing a transmit power of a device associated with the virtualized radio access network.

20. The method of claim 15, wherein the trained neural network comprises a multi-layer neural network having an input layer configured to receive the feature set and an output layer configured to output the classification of the at least one interference signal.

* * * * *